US007156736B2

(12) United States Patent
Adams et al.

(10) Patent No.: US 7,156,736 B2
(45) Date of Patent: Jan. 2, 2007

(54) METHODS OF CONDUCTING GAMES OF CHANCE AND GAMING DEVICES WITH MULTIPLE PAY LINES

(75) Inventors: William R. Adams, Las Vegas, NV (US); Mark A. Hettinger, Las Vegas, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 11/086,524

(22) Filed: Mar. 22, 2005

(65) Prior Publication Data

US 2005/0164776 A1 Jul. 28, 2005

Related U.S. Application Data

(63) Continuation of application No. 10/028,847, filed on Dec. 19, 2001, now Pat. No. 6,869,357.

(51) Int. Cl.
*A63F 13/00* (2006.01)

(52) U.S. Cl. ........................................................ 463/20

(58) Field of Classification Search .................. 463/16, 463/20–22, 25, 30; 273/138.1, 143 R, 142 R, 273/142 B See application file for complete search history.

(56) References Cited

U.S. PATENT DOCUMENTS

| | | | | |
|---|---|---|---|---|
| 4,676,506 | A | 6/1987 | Crouch | |
| 4,817,951 | A | 4/1989 | Crouch et al. | |
| 5,429,361 | A | 7/1995 | Raven et al. | |
| 5,511,784 | A | 4/1996 | Furry et al. | |
| 5,580,053 | A | 12/1996 | Crouch | |
| 5,611,535 | A | 3/1997 | Tiberio | |
| 5,704,835 | A | 1/1998 | Dietz, II | |
| 5,720,662 | A | 2/1998 | Holmes, Jr. et al. | |
| 5,766,074 | A | 6/1998 | Cannon et al. | |
| 5,807,172 | A | 9/1998 | Piechowiak | |
| 5,976,016 | A | 11/1999 | Moody et al. | |
| 6,053,813 | A | 4/2000 | Mathis | |
| 6,093,102 | A | 7/2000 | Bennett | |
| 6,120,378 | A | 9/2000 | Moody et al. | |
| 6,142,872 | A | 11/2000 | Walker et al. | |
| 6,241,607 | B1 * | 6/2001 | Payne et al. | 463/20 |
| 6,261,178 | B1 * | 7/2001 | Bennett | 463/20 |

FOREIGN PATENT DOCUMENTS

| | | |
|---|---|---|
| WO | WO 02/20082 | 4/2000 |

* cited by examiner

*Primary Examiner*—Kim Nguyen
(74) *Attorney, Agent, or Firm*—Marshall, Gerstein & Borun LLP

(57) ABSTRACT

Methods of playing games of chance and gaming devices comprising multiple wagering options. In one aspect, a single wagering unit activates a plurality of pay lines. In another aspect, at least one wager is randomly assigned to at least one pay line. Other aspects include novel arrangements of pay lines and wagering options to add excitement and enjoyment to the gaming experience. According to yet another embodiment of the present invention, one or more indicia for a particular pay line are received for display thereon from at least one other gaming device.

20 Claims, 8 Drawing Sheets

7-WAY PAYLINES

10-WAY PAYLINES

4X3 9-WAY PAYLINES

4X3 10-WAY PAYLINES

4X3 11-WAY PAYLINES

METHODS OF CONDUCTING GAMES OF CHANCE AND GAMING DEVICES WITH MULTIPLE PAY LINES

This application is a continuation of U.S. application Ser. No. 10/028,847, filed Dec. 19, 2001, and now issued as U.S. Pat. No. 6,869,357, which is hereby incorporated by reference in its entirety in the present application.

FIELD OF THE INVENTION

The present invention is directed to methods of playing games of chance and gaming devices and, more particularly, to new wagering options and new pay lines for use on gaming devices such as slot machines.

BACKGROUND OF THE INVENTION

Gaming devices, particularly slot machines, have been known to include multiple pay lines and to configure the display of a slot machine so that three different symbols on a single reel are visible. Known pay lines have been configured to extend across three reels of a slot machine to include one of the three visible indicia from each reel. Known pay line configurations have included, for example; pay line number 1 on the center row; pay line number 2 on the top row; pay line number 3 on the bottom row; pay line number 4 on a diagonal from the upper left row to the lower right column; pay line number 5 on a diagonal from the lower left column extending upward to the upper right indicia; and additional pay line number 6 which extends across the three reels in non-linear fashion to include one indicia from each reel. 9-way pay lines have been disclosed for three reel machines in U.S. Pat. No. 5,807,172 to Piechowiak ("the Piechowiak patent"). The additional 3 pay lines found in the Piechowiak patent are formed of the two upper corner indicia in combination the center indicia, the two lower corner symbols in combination with the center symbol, the two outer indicia of the middle row in combination with the upper middle indicia, and the two outer indicia of the middle row in combination with the lower middle indicia.

Recently, slot machines having as many as 27 pay lines have been disclosed in U.S. Pat. No. 5,580,053 to Crouch ("the Crouch patent"). The Crouch patent makes use of 5 reels with 3 indicia per reel, with the various pay line configurations extending across the 5 reels. To achieve 27 pay lines, the Crouch patent makes use of continuously adjacent, but not necessarily horizontally or diagonally extending, indicia positions in all 5-reel columns. U.S. Pat. Nos. 4,676,506 and 4,817,951, also to Crouch, respectively disclose the use of a variable odds indicator to modify the payouts for different poker hands on poker machines and a player operated instant lottery machine.

U.S. Pat. No. 5,611,535 to Tibero discloses a compound win line that combines at least one indicia from each reel and two or more indicia from a single reel.

U.S. Pat. No. 6,093,102 to Bennett ("the Bennett patent") discloses a gaming machine with a 5 by 3 display matrix in which players are able to select their own pay lines by selecting at least one indicia of their choice in each of the 5 adjacent columns of the display. By teaching that a "pay line" may constitute all possible combinations of player-selected indicia positions extending across each of the 5 columns of the display, the Bennett patent discloses 243 potential pay lines.

Typically, a single wager will activate a single pay line, such as the center pay line, and extra coins will activate additional pay lines. In PCT Application Number PCT/US99/23011, pay line buttons are disclosed which allow a player to make independent wagers for each pay line.

While players enjoy wagering on the multiple pay line slot machines, those skilled in the art will appreciate that players enjoy the excitement which accompanies new and different wagering options. In this regard, the previously known wagering methods and sequences are time consuming and, in some ways, limiting to a player. For example, a player may wish to activate more than one pay line with a single wager. It would also be desirable in some instances, to increase the player's rate of making wagers. It would be further desirable to increase a player's wagering options when wagering on a multiple pay line gaming device.

These and other advantages are provided with various embodiments of the present invention.

SUMMARY OF THE INVENTION

The various embodiments of the present invention are directed to methods of playing games of chance and gaming devices comprising multiple wagering options. According to one embodiment of the present invention, a single wagering unit activates a plurality of pay lines, which may include all pay lines of a gaming device. For example, a one dollar token or credit wagered in a gaming device of this embodiment activates pay lines designated 1–3, while a second token activates pay lines designated 4–6, etc., or a one dollar token or credit may be used to activate all available pay lines.

According to a further embodiment of the present invention, at least one wager is randomly assigned to a pay line. The randomly assigned wager may be assigned to a single pay line or to a plurality of pay lines. The randomly assigned wager may be provided as a randomly controlled bonus or can be activated in response to some gaming parameter over which a player exerts some or entire control, such as the rate of play, the number of games played, or the wagering of wagers having a predetermined minimum value, e.g., wagering the maximum amount permitted.

According to a still further embodiment of the present invention, novel pay lines are disclosed which utilize predetermined patterns of nonadjacent indicia on adjacent reels, alone or in combination with various pay line configurations with pay lines having differing numbers of indicia.

According to another embodiment of the present invention, one or more indicia of a particular pay line may be displayed from one or more other gaming devices. In addition, an award may predicated upon the occurrence of selected indicia on gaming devices separate from but linked to a gaming device being played by a given player.

Other features and advantages of the present invention will become apparent to those of skill in the art through consideration of the ensuing description, the accompanying drawings, and the appended claims.

BRIEF DESCRIPTION OF THE DRAWINGS

In the drawings, which illustrate what is currently considered to be the best mode for carrying out the invention.

DETAILED DESCRIPTION OF THE INVENTION

Figure 1:
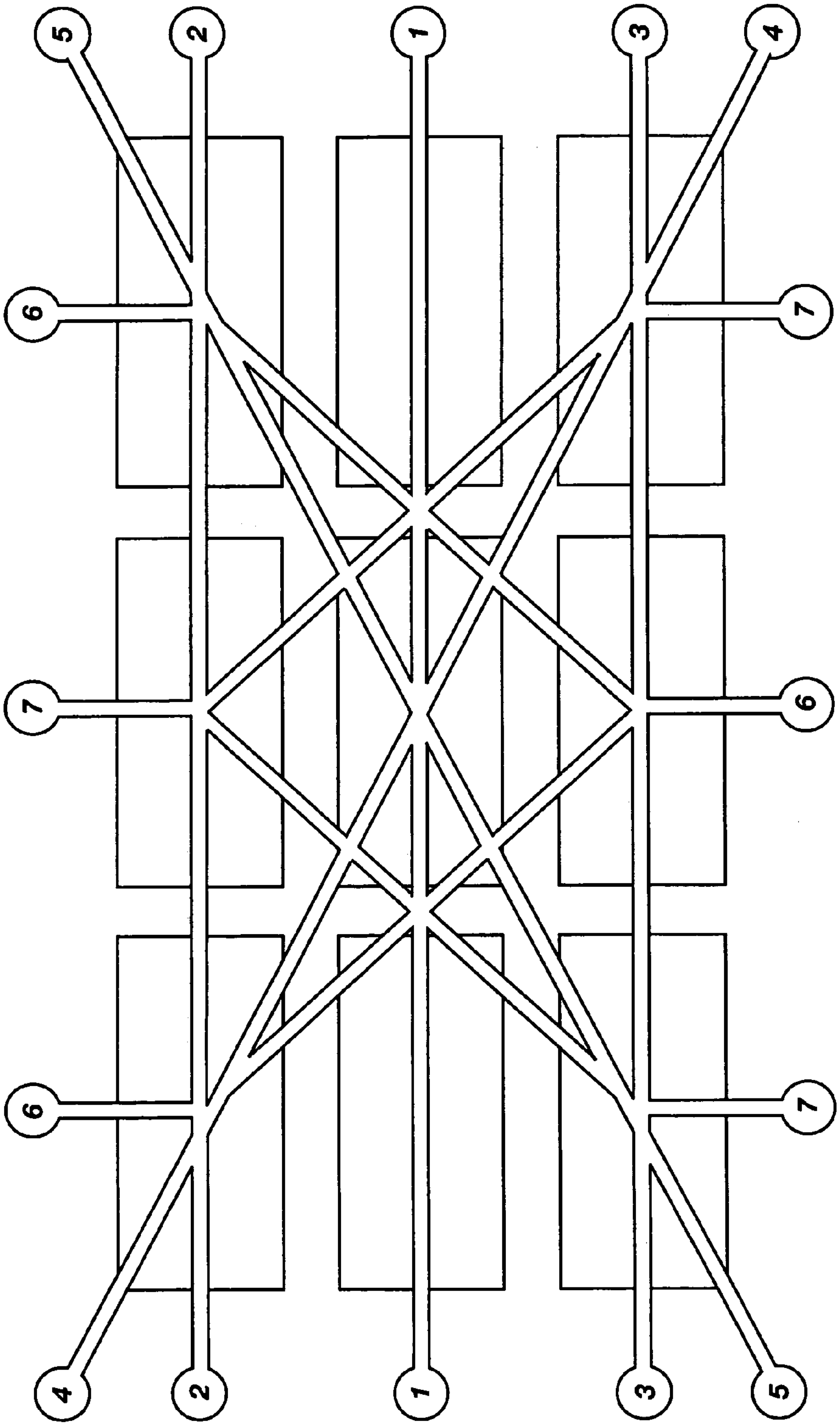
FIG. 1 is a diagram illustrating a seven-way pay line format for a 3 by 3 display.

The various embodiments of the present invention are directed to methods of playing games of chance and gaming devices comprising multiple wagering options.

According to one embodiment of the present invention, a gaming machine is configured such that the wagering of a single wagering unit may be used to activate a plurality of pay lines, up to and including all pay lines of the gaming machine. As used herein the term "single wagering unit" is intended to mean a wager by a single unit of casino-approved currency. For example, a single wagering unit may be 25 cents, $1.00, $5.00, $10.00, a casino token, or some other predetermined amount represented by a single currency unit or a fraction of a currency unit, such as seven cents (seven-tenths of a dime), three cents (three-fifths of a nickel) or one-half of one cent. As such, the activation of a plurality of pay lines by a single wagering unit is distinguished from the activation of a plurality of pay lines by the wagering of multiple wagering units (i.e., use of more than one unit of currency) and is dependent upon the set denomination of the game being played, e.g., whether one-half cent, three cents, or a dollar.

Typically, the activation of the plurality of pay lines by a single wagering unit will be effected by a microprocessor, the microprocessor activating a plurality of pay lines as a response to signals sent by a sensor upon the deposit of an appropriate single wagering unit into the gaming machine. For example, when playing on a 25 cent slot machine comprising 9 pay lines, the wagering of a quarter may be used to activate three pay lines, while the wagering of a second quarter may be used to activate another three pay lines, etc. The number and location of pay lines to be activated may be predetermined and published on a pay table, or may be randomly set by a microprocessor within the slot machine. Alternatively, a player might use a single wagering unit to select a particular number or grouping of pay lines. Particular pay lines comprising a plurality of pay lines activated by a single wagering unit may be selected individually, for example, by use of push buttons associated with respective pay lines, by a touch sensitive screen, by a touch pad, by a mouse, by a light pen or by any other suitable device usable as a pointer or cursor control. A single button may also be used to select a particular grouping of pay lines.

According to a further embodiment of the present invention, the wagering of a first single wagering unit may be used to activate a first number of pay lines, while the wagering of a second and/or subsequent single wagering unit may be used to activate one or more additional pay lines. Preferably, the additional pay lines activated by the second and/or subsequent single wagering unit will not overlap with any of the first plurality of pay lines activated by the first single wagering unit.

Alternatively, the wagering of a first single wagering unit may be used to activate a single pay line while the wagering of a second and/or subsequent single wagering unit can activate a plurality of additional pay lines. According to this embodiment of the present invention, the wagering of at least one of a plurality of single wagering units in addition to a first, single wagering unit will activate a plurality of pay lines.

From the present description, those skilled in the art will appreciate that the amount of the single wagering unit may be readily changed and determined by the particular gaming jurisdiction, gaming establishment, or the manufacturer and be easily set to utilize local currency of any jurisdiction. Unlike multiple pay line slot machines previously known which require additional wagers to activate additional pay lines, this embodiment of the present invention advantageously provides a player with the chance of winning on multiple pay lines and the accompanying excitement upon the wagering of a single wagering unit. Furthermore, this embodiment of the present invention may be utilized with gaming devices having any number of pay lines. One skilled in the art will recognize that the number of pay lines to be activated responsive to the wagering of a first single wagering unit, as well as the number of pay lines to be activated upon the wagering of subsequent single wagering units, may be changed without departing from the scope of the present invention.

According to a still further embodiment of the present invention, at least one pay line is activated or at least one wager is assigned to a pay line randomly. Thus, a pay line which had not been activated by a player may be activated randomly or, on a pay line which had already been activated, an additional wager will be made such that the amount wagered on that activated pay line will be automatically increased. The randomly assigned wager may be provided as a randomly controlled bonus, in which case the payment of the randomly controlled bonus preferably will be in an amount which varies from other payout payments provided by the slot machine. The randomly assigned wager may also be activated in response to some gaming parameter over which a player exerts some or entire control, such as the player's rate of play, the wagering of one or more wagers having a predetermined value (such one or more wagers of the maximum amount permitted), the number of games played by a player, the use of a casino club card, or an outcome of a previous game.

For example, a particular outcome on any one previous game or series of games, such as a particular display of indicia, may cause one of these randomly controlled events to occur on a subsequent game. As another example, a slot machine may be configured to process and react to a combination and/or series of events under a player's control, such as a player's rate of play and amounts wagered. Upon a player fulfilling predetermined rate of play and/or wagering parameters, a programmed microprocessor in a gaming machine may perform one or more of the following acts: activate a randomly assigned pay line; allow the player to activate one or more bonus pay lines; increase the wagering value of one or more of the player's present wagers; add one or more credits to the player's reserve of unwagered credits; allow one or more desired indicia to be selected or held in place on one or more particular pay lines for a subsequent game; or pay out a specific bonus regardless of the outcome of a particular previously played game.

In a related embodiment, a player's rate of play, amount of money wagered, and other gaming parameters may be tracked by a central database linked to the gaming machine, the database being configured to identify a player by the insertion of his or her club or other player tracking card into the gaming machine or by use of other identifying indicia such as a PIN number entry, or use of so-called "Bluetooth" communications technology. Tracking data acquired by the database may then be used to activate the randomly assigned wager or bonus. In this embodiment, a player's use of a club card or other identification in association with other, different games may also be taken into account in allocating a randomly assigned wager or bonus.

Other embodiments of the present invention provide novel pay lines, such as those illustrated in FIGS. 1–5. The embodiments of the present invention illustrated in FIGS. 1 and 2 comprise novel displays of 3 by 3 pay lines, while the embodiments shown in FIGS. 3–5 comprise displays of 4 by 3 pay lines wherein a plurality of pay lines are defined by three indicia positions, and other pay lines are defined by more than three indicia positions.

FIG. 1 schematically illustrates the displays of three reels wherein three indicia positions on each reel are displayed. As is known in the art, the reels may comprise movable, electromechanically or electronically actuated reels, or a simulation of multiple reels displayed on an electronic display. This illustrated display comprises 3 by 3 preconfigured pay line patterns defined by nonadjacent indicia positions on adjacent reels. As shown by FIG. 1, the 7-way pay line of the present invention includes conventional pay lines, such as pay line number 1, which is defined by the center indicia position display on each of the three reels so that the pay line is defined by adjacent indicia position displays on adjacent reels, and pay line number four, which is defined by the top indicia position display on the left reel, the center indicia position display on the middle reel, and the lower indicia position display on the right reel. Pay line numbers six and seven of this embodiment of the present invention are defined by nonadjacent indicia positions on adjacent reels. By "nonadjacent indicia positions on adjacent reels", it is meant that the subject indicia positions are not immediately adjacent to one another when viewed either horizontally or diagonally across adjacent reels. As illustrated in FIG. 1, pay line number six is defined by the upper indicia position on the left reel, the lower indicia position on the center reel, and the upper indicia position on the right reel. Thus, nonadjacent indicia positions on adjacent reels are used to define pay line number six. Similarly, pay line number seven is defined by nonadjacent indicia positions on adjacent reels comprising the lower indicia position on the left reel, the upper indicia position of the middle reel, and the lower indicia position on the right reel.

The preconfigured pay lines illustrated in FIG. 1 may be displayed on a pay table viewable by a player of the slot machine, with each pay line preferably associated with a selecting pay line button/keypad. The pre-configured pay lines may also be selected by a use of a touch sensitive screen. By providing the appropriate wager amounts and by using the select pay line button/key pad (or touch sensitive screen segment), a player may select one or more of the pre-configured pay lines in any order or sequence desired by the player. For example, a player might elect to place a wager of five coins and select only pay line number six, while not making any other wagers on the available pay lines. Alternatively, the gaming machine may be programmed to permit a player to pre-select one or more of the preconfigured pay lines, and then be prompted by those particular pay lines with the opportunity to input a desired wager.

Figure 2:
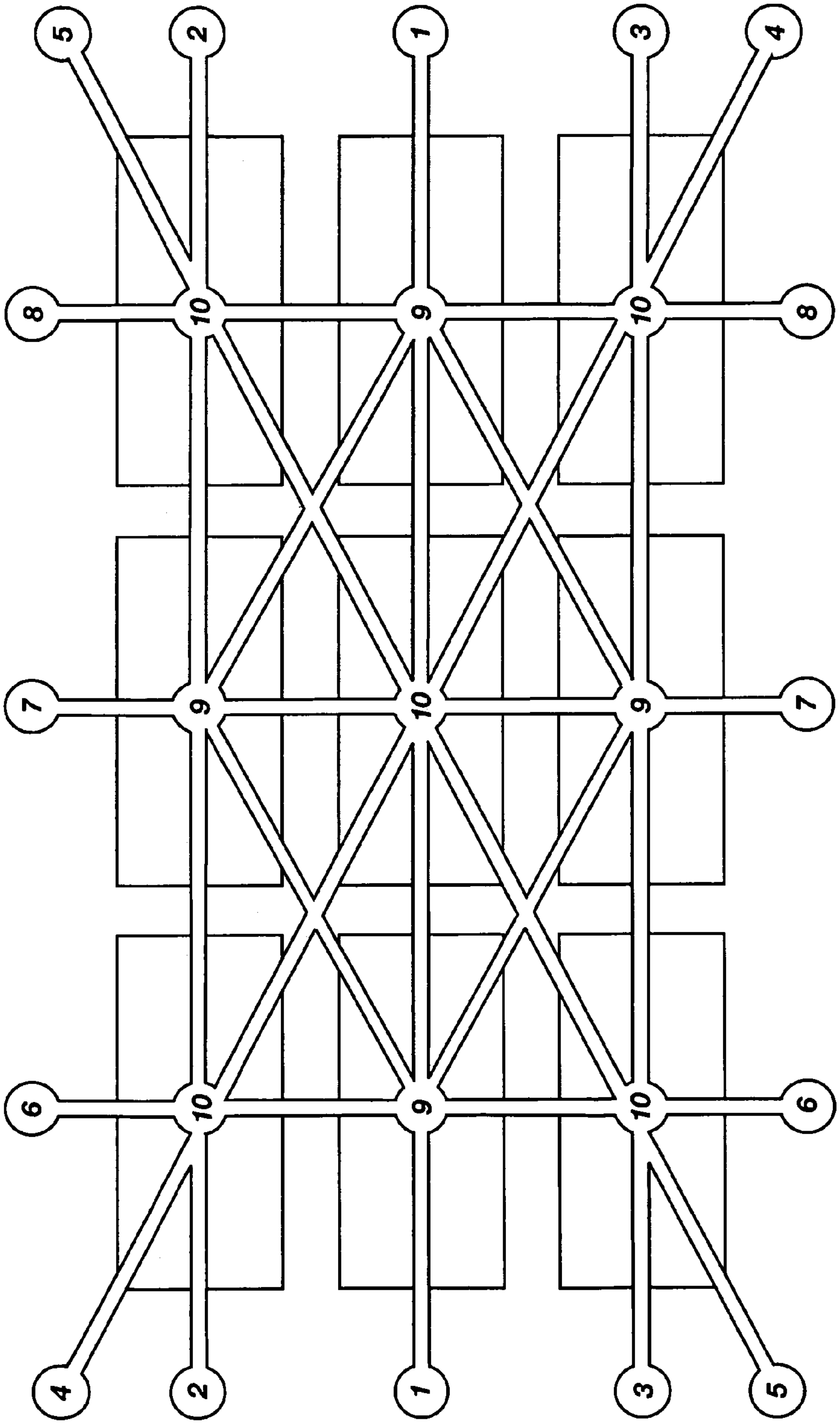
FIG. 2 is a diagram illustrating a ten-way pay line format for a 3 by 3 display.

FIG. 2 illustrates an embodiment of the present invention wherein a 3 by 3 display comprises a 10-way pay line defined by three differing numbers of indicia positions. In FIG. 2, pay line number ten comprises five indicia positions, pay line number nine is defined by four indicia positions, while pay lines numbers one through eight are each defined by three indicia positions. As illustrated in FIG. 2, pay line number ten is defined by the top and bottom indicia positions on the left reel, the middle indicia position on the center reel, and the top and bottom indicia positions on the right reel. Pay line number nine is defined by the center indicia position on the left reel, both the top and bottom indicia positions on the center reel, and the center indicia position on the right reel. Each of pay lines one through eight is defined by three indicia positions in varying vertical, horizontal and diagonal configurations.

In one form of the multiple indicia position pay line embodiment shown in FIG. 2, a player is awarded a winning payout if any of a predetermined number of indicia otherwise meet the particular game's criteria of a winning payout. Therefore, if three indicia are necessary for any winning payout, and those three indicia are present within the four indicia positions of pay line number nine illustrated in FIG. 2, then in a game where pay line nine has been activated, a player is provided with the corresponding winning payout. A payout would likewise be provided if those three indicia are present within the five indicia positions of an activated pay line number ten. Similarly, if only one wild indicia is required for a winning payout, if that wild indicia has appeared in any of the indicia positions of pay line numbers nine and/or ten, and if those respective pay line(s) had been activated, then the player would receive the corresponding award.

In a related embodiment of FIG. 2, correspondingly higher payouts may be offered when a game's further criteria for a winning payout includes four or more necessary indicia. Thus, a higher payout may be made based upon the presence of all necessary indicia within the four indicia positions of pay line number nine. The presence of each of five necessary indicia within the five indicia positions of pay line number 10 might be programmed, for example, to result in the highest payout provided by the slot machine.

To implement a pay line pattern wherein a pay line is defined by indicia positions on the same reel, such as pay line numbers six through eight and pay line ten of FIG. 2, a slot machine may be configured, for example, with a video display in which spinning reels or other indicia "movements" are simulated by video images of indicia. A random number generator may be used to select a "virtual" position for each indicia on a reel, to include possibly selecting matching indicia on the same reel. Each displayed indicia position may then be achieved independently from other displayed indicia positions on the same reel. For ease of description, the arrays of indicia of video displays are described herein in a conventional manner by making use of the terms "reels" or "rotatable reels."

Figure 3:
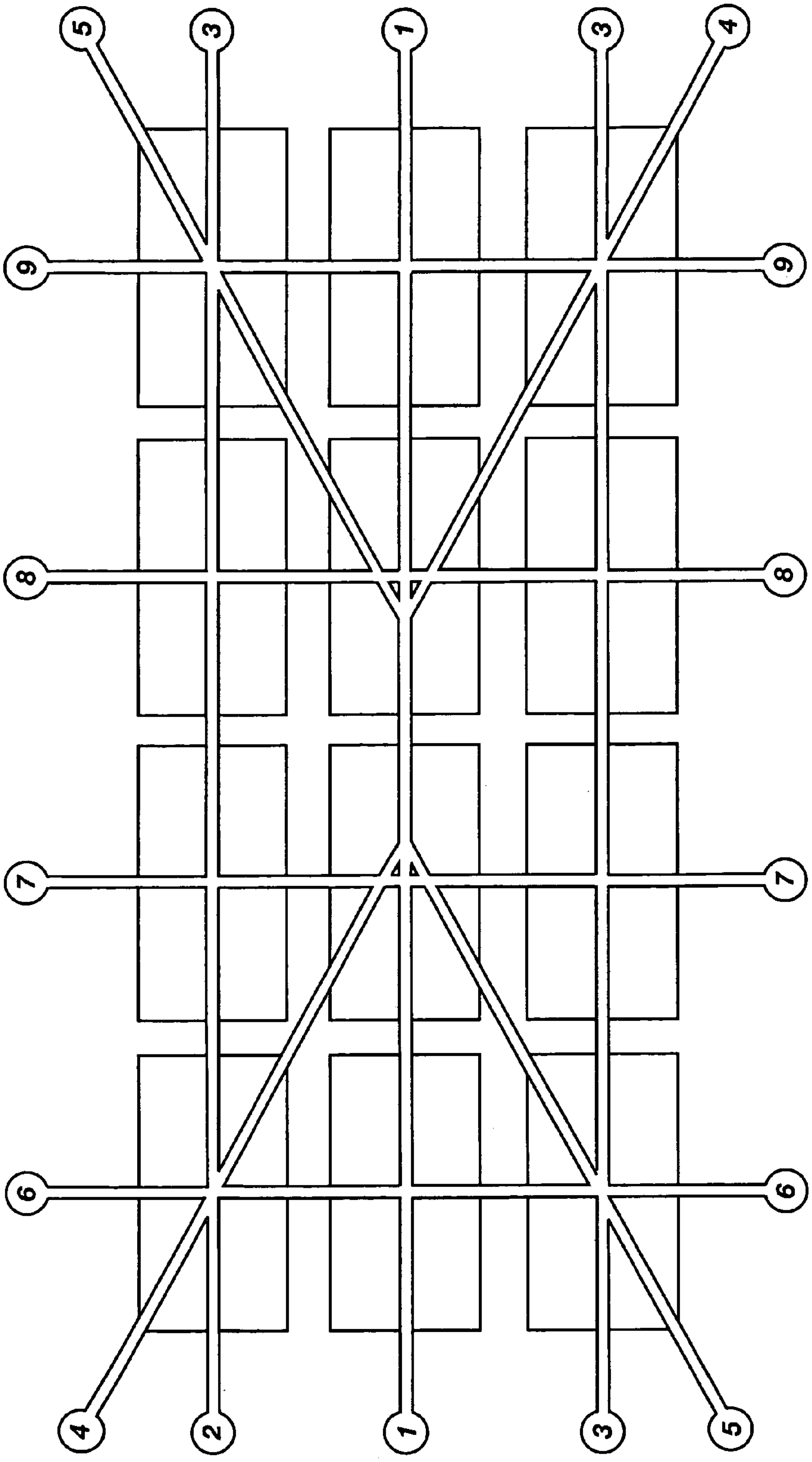
FIG. 3 is a diagram illustrating a nine-way pay line format for a 4 by 3 display.
Figure 4:
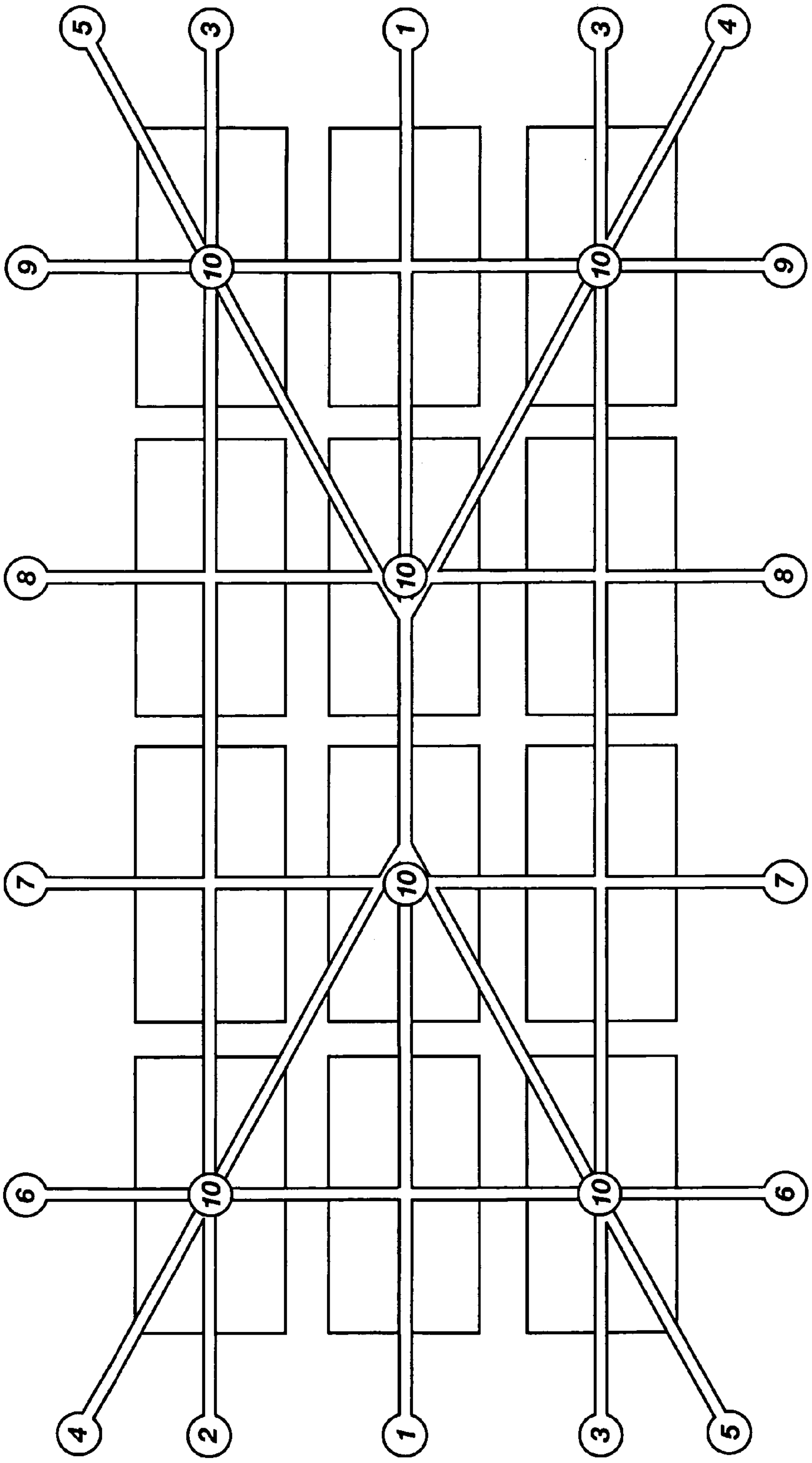
FIG. 4 is a diagram illustrating a ten-way pay line format for a 4 by 3 display.
Figure 5:
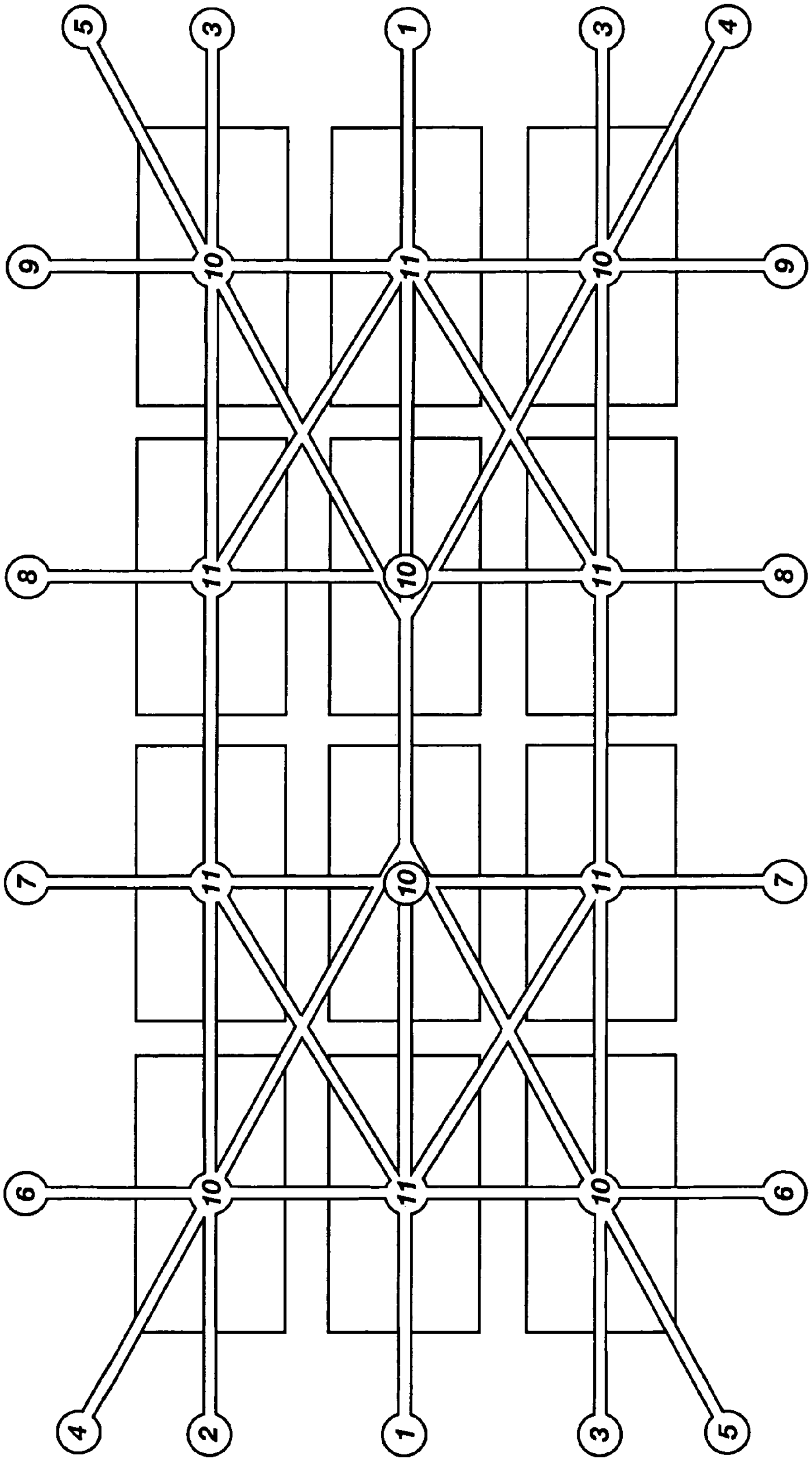
FIG. 5 is a diagram illustrating a eleven-way pay line format for a 4 by 3 display.

FIGS. 3, 4, and 5 illustrate other displays usable for implementation of the present invention comprising 4 by 3 displays of indicia positions. The use of 4 by 3 displays of indicia positions according to the present invention increases the available alternatives for interesting pay lines, and further permits a gaming machine to make use of differing numbers of pay line indicia positions for different pay lines. Among other things, the differing numbers of pay line indicia positions allow for variations in the criteria for winning payouts, as was previously described in relation to FIG. 2.

In FIG. 3, a 9-way pay line display is disclosed in which three indicia positions from each of four reels are displayed as vertical pay line numbers six through nine, four indicia positions extending horizontally across the four reels are displayed as pay line numbers one through three, and pay line numbers four and five are each comprised of four indicia positions extending non-linearly across the four reels.

In FIG. 4, pay line number ten is added as a pay line in addition to those pay lines shown in FIG. 3 to create a 10-way pay line format. As illustrated by FIG. 4, pay line number 10 comprises six indicia positions—the top and bottom indicia positions of the first reel, the middle indicia position of the second and third reels, and the top and bottom indicia positions of the fourth reel. The 10-way display of FIG. 4 is thus configured with three differing numbers of indicia positions, pay line numbers six through nine comprising three indicia positions, pay line numbers one through five comprising four indicia positions, and pay line number ten comprising six indicia positions.

The display in FIG. 5 comprises an 11-way pay line format with two pay lines defined by six indicia positions. As illustrated, pay line numbers ten and eleven both comprise different sets of six indicia positions. Pay line number ten is as previously described in relation to FIG. 4. Pay line number eleven comprises the middle indicia position of the first reel, the top and bottom indicia position of the second and third reels, and the middle indicia position of the fourth reel.

One of skill in the art will appreciate that one or more pay lines comprising five indicia positions may be added to the four indicia position and three indicia position embodiment of FIG. 3, as well as to the six indicia position, four indicia position and three indicia position embodiments of FIGS. 4 and 5. A five indicia position pay line in a 4 by 3 display may comprise, for example, the top and bottom indicia positions of the first reel, and the middle indicia position of the second, third and fourth reels. One of ordinary skill in the art will recognize other variations of a five indicia position pay line in accordance with the present invention, such as the middle indicia position of the first, second and third reels, and the top and bottom indicia positions of the fourth reel. An additional pay line with a further differing number of indicia positions provides an interesting pay line pattern and adds to the enjoyment of the game by making more winning variations and combinations possible.

As a further variation of the 4 by 3 display configuration, additional pay lines of four indicia positions may be provided which make use of nonadjacent indicia positions on adjacent reels. Thus, additional pay lines are contemplated which are formed, for example, by alternation of the top and bottom indicia positions of each of the adjacent reels. For example, four indicia pay lines making use of nonadjacent indicia positions on adjacent reels may be formed by the top or bottom indicia position of the first and fourth reels in combination with the bottom or top indicia position, respectively, of the second and third reels.

Further, pay lines comprising less than three indicia positions are contemplated by the present invention. For example, indicia from any one or two of the rotatable reels on a slot machine display may comprise a pay line upon which a winning payout may be realized. Pay lines of less than three indicia positions may be independently selected for activation, may be activated randomly, or may be associated with a group of pay lines activated, for example, by the deposit of a single wagering unit. In an exemplary embodiment of the present invention, a pay line of less than three indicia positions may be triggered upon the wagering of the maximum amount permitted, with the slot machine programmed to pay out the amount wagered, in accordance with the machine's pay table, when the necessary, preselected indicia are present in the subject pay line.

Figure 9:
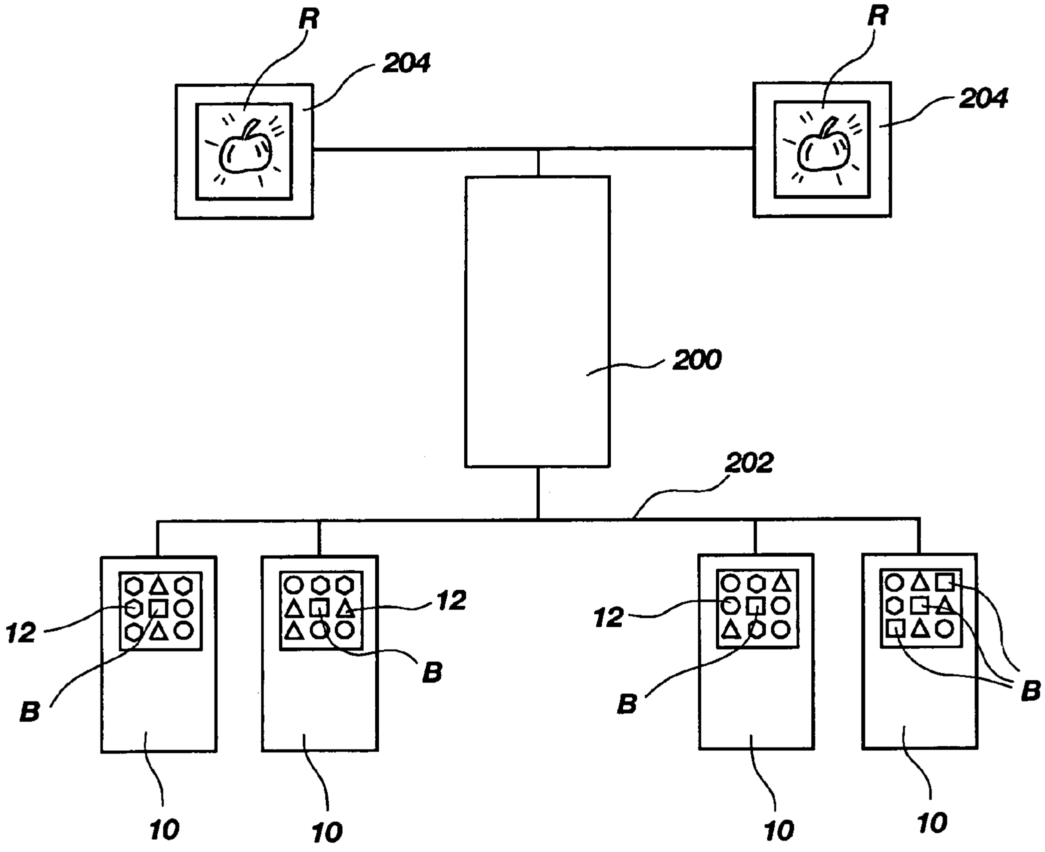
FIG. 9 is a schematic showing a plurality of gaming devices linked to another, central or otherwise remote gaming device for implementing one embodiment of the present invention.

While the illustrated displays may be employed with individual reel-type gaming machines, other indicia may also be received for display from one or more other gaming devices, such as a centrally or peripherally located gaming device. For example, a central indicia position in a 3 by 3 display of a gaming device may display one or more "blank indicia" such as an empty box, a question mark, or other symbol not associated with any possibility of a winning combination of indicia, in which case winning criteria for the player's gaming device pay line may be tied to, for example, receipt of one or more substitute indicia provided by a centrally or peripherally located gaming device which is linked to the player's gaming device, the centrally or peripherally located gaming device replacing the player's remote gaming device's blank indicia with another, substitute indicia. Such an arrangement is depicted in FIG. 9, wherein a plurality of gaming devices 10 programmed to implement one or more embodiments of the present invention are linked to a centrally or peripherally located gaming device 200. It is further contemplated that a particular award may be triggered on a gaming device 10 upon receipt of a predetermined substitute indicia from another centrally or peripherally related gaming device 200. In addition, in lieu of the use of a centrally or peripherally related gaming device 200, a plurality of gaming devices 10 may be networked and substitute indicia from each gaming device 10 in play at a given time forwarded randomly or in some predetermined programmed sequence to another networked gaming device 10 in play at that time.

In this embodiment, the display 12 of a gaming device 10 may be configured to incorporate the indicia generated by another gaming device 200 (or 10) upon each spin, or the display 12 could introduce the indicia from the other gaming device 200 (or 10) only when certain indicia positions of one or more of the visibly perceptible reels of a gaming device 10 which may receive the substitute indicia are in a predetermined configuration, as recognized by the microprocessor of gaming device 10.

In an exemplary embodiment, the results of a substantially contemporaneous "spin" or other activation of the centrally or peripherally located gaming device 200 may replace the "blank indicia" for the subject pay line of the player's gaming device 10. The results of the substantially contemporaneous spin may be requested from the centrally or peripherally located gaming device 200 (or another gaming device 10) by the player's remote gaming device 10, or may be automatically sent by the centrally or peripherally located gaming device 200 (or another gaming device 10) to the player's remote gaming device 10 for processing. For ease of description, the one or more indicia provided by the centrally or peripherally located gaming device 200 or another gaming device 10 will be referred to as the "rendered indicia."

A data transfer link 202 as shown in FIG. 9 between each player's gaming device 10 and the centrally or peripherally located gaming device 200 may be effectuated, for example, by use of communication links known in the art. The communication links may be tied to a casino intranet system, such as a local area network (LAN), or through use of a multi-property wide area network (WAN). It is also contemplated that secure, such as encrypted, Internet communication may be employed. The results (data) of a substantially contemporaneous spin of a gaming device 200 or 10 in the form of one or more rendered indicia may be transferred, via a communication link or links, to each player's remote gaming device 10, wherein the rendered indicia may be processed into the subject pay line of the player's remote gaming device 10 to replace on or more blank indicia B and evaluated with other indicia on the indicia positions of that pay line against criteria for a winning combination of indicia. As noted above, one of ordinary skill in the art will appreciate that the centrally or peripherally located gaming device 200 may comprise an otherwise conventional player-activated gaming device 10 modified to generate a rendered indicia for transmission to other gaming devices 10, and/or the centrally or peripherally located gaming device 200 may be operated by the casino independently of any player (i.e., autonomously) to otherwise ensure regular, secure and fair intervals of spins and generation of rendered indicia. In either case, the rendered indicia on the centrally or peripherally located gaming device 200 may be made more readily apparent to a gaming machine player by means known in the art, such as by illumination, flashing or movement of the rendered indicia on the video display of the player's gaming device 10, an audible alarm associated with the arrival of a rendered indicia, and the like. The rendered indicia may also preferably be displayed on one or more large viewing screens or other displays 204 linked to the centrally or peripherally located gaming device 200, and which are remotely located with respect to the player's gaming device 10. Preferably, at least one of the one or more viewing screens would be positioned so as to be viewable by players playing the gaming devices 10. The rendered indicia resulting from a substantially contemporaneous spin of gaming device 200 may also be viewed indirectly, for example, through a linked "window" provided on the player's gaming device 10. In one embodiment, the linked window may be part of a display of a video monitor in which the rendered indicia are transposed over the "blank indicia" on the display of a gaming device after the data from the substantially contemporaneous spin has been received.

Figure 6:
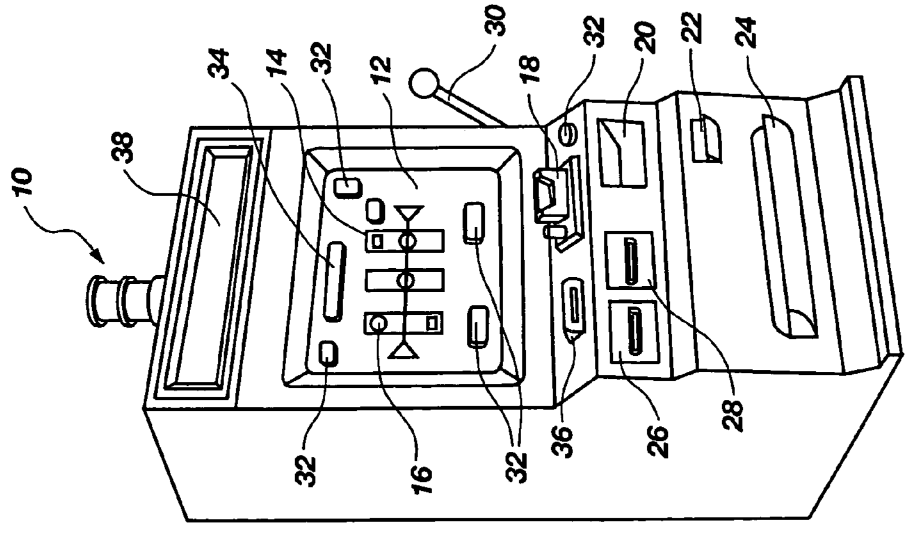
FIG. 6 is a perspective illustration of an exemplary gaming device which may be used to implement the present invention.

FIG. 6 illustrates an exemplary gaming device 10 which may be employed for play of games according to the present invention. The gaming device 10 is configured as a conventional "slot machine", although the physical appearance of the machine housing and the illustrated features thereof are not intended as limiting of the present invention. For example, the present invention may be implemented on one or more remote terminals linked to a server, in the arrangement of a LAN, a WAN or even a secure real-time Internet connection. Gaming device 10 includes a display 12, which is configured for a visually perceptible display of a plurality of adjacent reels 14 each bearing a plurality of indicia 16 which may comprise, by way of example only and as known in the art, numbers, bars, fruit, medallions, stars and the like. Display 12 may comprise an electronic video display such as a cathode ray tube display, plasma display, field emission display, or other suitable electronic video display known in the art. Alternatively, display 12 may comprise electromechanically or electronically controlled reels, also as known in the art. In an electronic video display implementation, reel images, the identity of the indicia thereon and the visually perceptible movement of the indicia as the reels "spin" may be determined conventionally by software controlling the display to appropriately set forth a game outcome produced by a random number generator. In the case of electromechanically or electronically controlled reels, conventional reel spinning and arresting mechanisms for display of a game outcome are well known.

Gaming device 10 may further include a coin acceptor 18 for receiving a wager in the form of one or more coins or tokens, a paper currency (bill) acceptor 20, a change return 22 and a hopper 24 for rendering payouts in the form of coins or tokens. A player tracking card reader 26 and a credit/debit card reader 28 may also be included, as desired. A handle 30 or one or more buttons 32 may also be employed to initiate a game once a wager has been placed. Buttons 32 may comprise actual physical elements or the display 12 may (as shown) comprise a portion of a "touch" screen display responsive to contact of areas thereon by the player or comprise other player input elements such as a mouse, light pen, touch pad or other cursor or pointer control. Gaming device 10 may also incorporate one or more meter displays 34 for, for example, displaying the amount of winnings, credit available for wagering, the number of plays accumulated, etc., and a printer 36 for generating a physical record of an award. Pay tables or other game-associated information may also be displayed, as above display 12 at 38.

Figure 7:
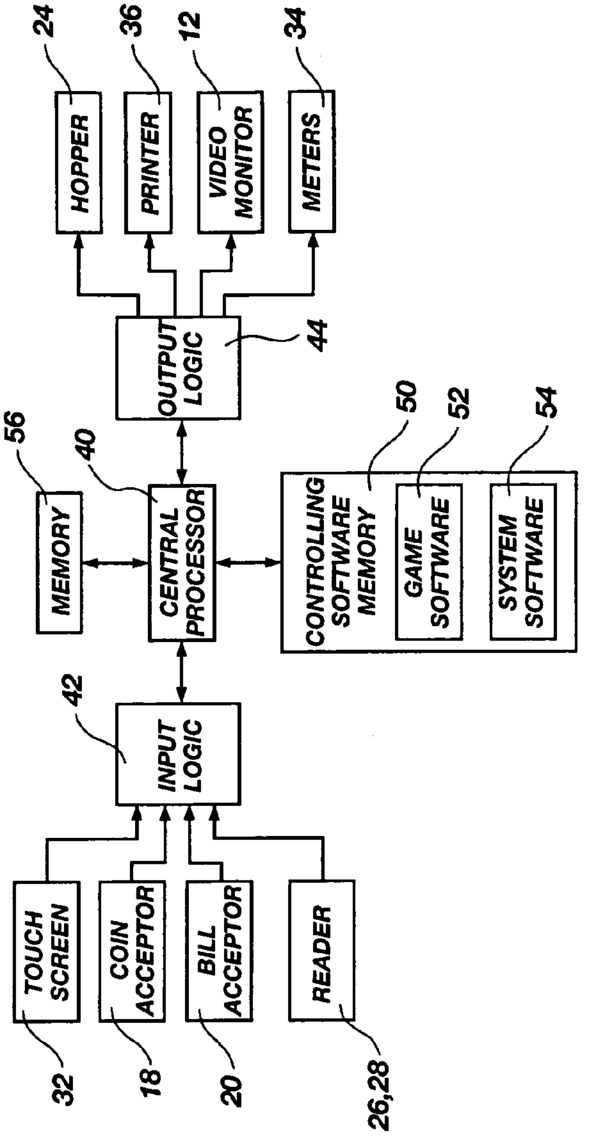
FIG. 7 is a block diagram of exemplary electronic hardware which may be used in the gaming device of FIG. 6.

Referring now to FIG. 7, gaming device 10 may be provided with a central processing unit (CPU) 40 operably coupled to input logic circuitry 42 and output logic circuitry 44. Input logic circuitry 42 is employed to operably couple CPU 40 to input devices such as, for example, a touch screen segment or physical button 32, coin acceptor 18, bill acceptor 20, player tracking card reader 26 or credit/debit card reader 28. Output logic circuitry 44 is employed to operably couple CPU 40 with output devices such as, for example, hopper 24, display 12, meters 34 and printer 36. Display 12 may, as previously noted, comprise a video monitor of a suitable type.

CPU 40 is also operably coupled to control software memory 50, which includes assigned memory locations storing game software 52 and system software 54. Such control software dictates when selected graphics or messages are displayed to a player, as well as when game begins and ends and management of wager input and award output. CPU 40 is also operably coupled to a second memory 56, which is employed to store data indicative of game statistics, number of plays, number of wins, etc. Either memory location 52 or memory 56 may be used to store data indicative of winning results, such as data representative of one or more indicia combinations, including winning combinations. Memory 56 may also be used to store a bit map of the indicia pattern depicted on display 12.

Figure 8:
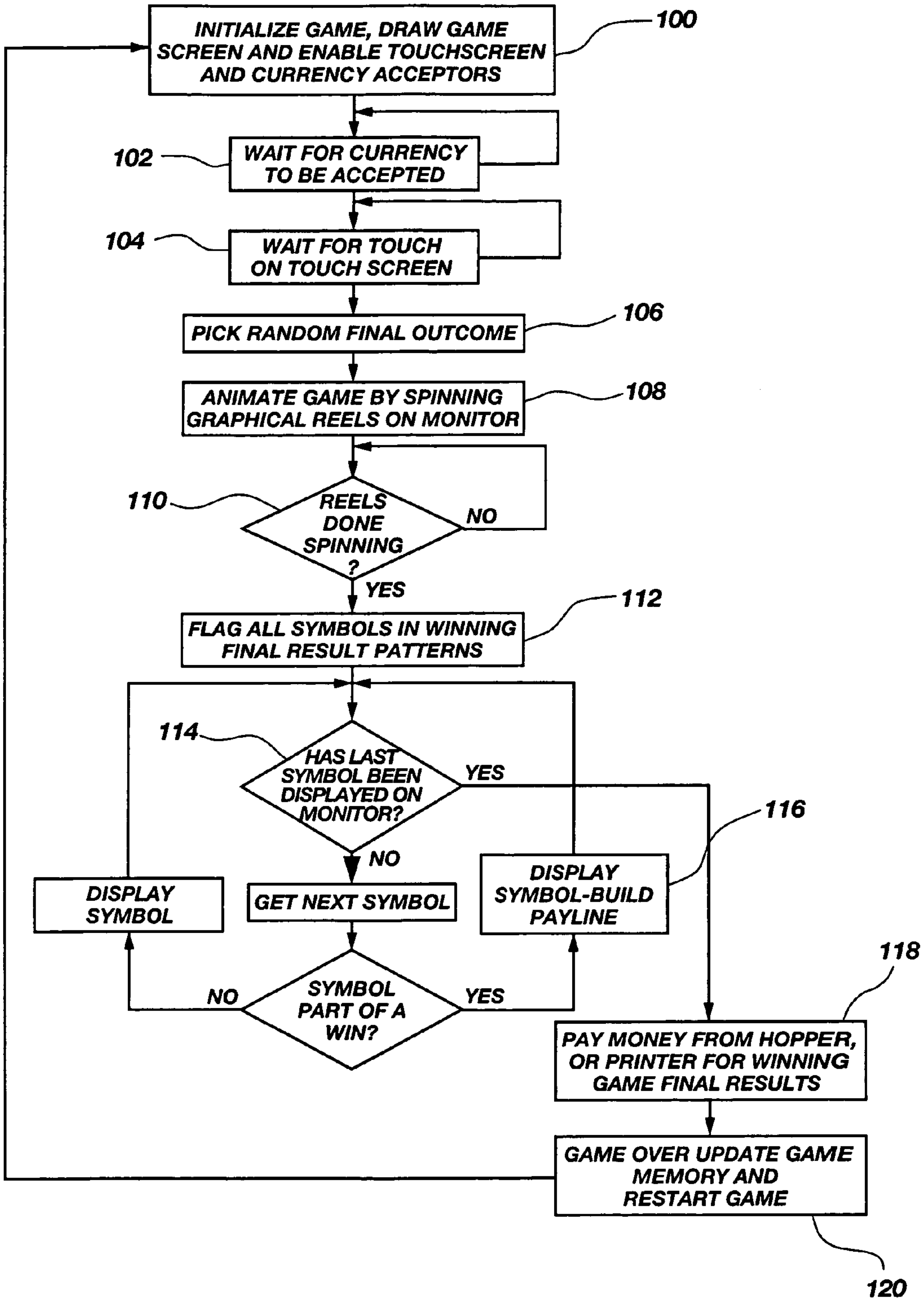
FIG. 8 is a flow chart illustrating operation of the gaming device of FIG. 6 and electronic hardware of FIG. 7 to implement the present invention.

Referring now to FIG. 8, the general operation of exemplary gaming device 10 will be described, including the operation of CPU 40 in combination with game software 52 and system software 54. Gaming device 10 is initialized at 100, as by a casino operator, responsive to which CPU 40 carries out instructions of system software 54 to implement an initial display pattern on display 12 and to enable the input devices as previously mentioned. Gaming device 10 then remains in a passive or waiting state 102 until currency or the equivalent is input for a wager and is validated by CPU 40. At this point gaming machine 10 is placed in a ready state 104 until a player activates an input device such as handle 30 or button 32 to initiate play of a game. At this point, the game software 52 randomly generates indicia 106 for a random final outcome comprised of a pattern of indicia for depiction on display 12, as known in the art. System software 54 then animates the video monitor of display 12 at 108 by simulating the "spinning" of reels including indicia thereon. Once the representation of the spinning reels has stopped 110, all of the generated, displayed indicia or symbols comprising a winning combination or combinations are identified or flagged 112. As depicted in FIG. 9, each flagged symbol or indicia of a winning combination may be displayed in sequence at 114 to "build" a winning pay line at 116, if desired. In the present invention, this technique may be used in a particularly effective manner to build suspense as the pay line builds, and to identify unusual, not readily appreciated pay lines as are employed with some embodiments of the present invention. Each pay line may be flagged on the display with a different color or other common link between all of the indicia positions included in a given, winning pay line. In one embodiment, the pay lines with winning combinations of indicia may have a line generated therethrough, the indicia on the winning pay line may be more brightly illuminated, the non-winning indicia reduced in brightness, or the winning combinations otherwise highlighted on the display as known in the art. In the embodiment of the present invention wherein one or more indicia positions on a virtual reel of a pattern of indicia depicted on display 12 is blank and a rendered indicia from another gaming device 200 is to be substituted therefor, the combination of indicia is not finalized for comparison to stored possible winning combinations of indicia associated with various activated pay lines until the rendered indicia is received. A payout may be generated 118 in association with completion of each winning pay line build, or at the conclusion of all of the pay line builds. When the game is over, the gaming device 10 resets at 120 for future play.

The manner in which winning combinations of indicia are determined and flagged is well known in the art, and so will be described only briefly. The displayed results (pattern of indicia depicted on display 12), including any rendered indicia received from a remote location, is compared with data stored in game software 54 representing winning combinations to determine if any displayed combination on an activated pay line is a winning combination. Any identified winning combination or combinations of indicia are then associated with winnings to be distributed to the player according to a pay table of the game software associated with the various possible winning combinations. Thus, in the context of the present invention, the various pay line configurations and required combinations of the various indicia for a winning combination within each pay line reside within game software 54 and are retrieved for comparison to the randomly generated pattern of indicia depicted on display 12.

It is also contemplated that the present invention may include a feature wherein a multiple of a single wagering unit may be used to activate a particular, chosen pay line. For example, a gaming device denominated at twenty-five cents may be configured to enable multiples thereof to be wagered on different pay lines so that twenty-five cents may be wagered on pay line one, seventy-five cents on pay line three and twenty-five cents on pay line nine. Of course, this aspect of the invention in its broadest sense enables varied wager amounts specific to each pay line selected by a player, which selection may but does not necessarily, encompass all pay lines. Further, it is contemplated that wagers may be placed in any order, so that, for example, a first wager may be placed on pay line nine, a second wager on pay line one, and a third wager on pay line three. Yet further, it is contemplated that a wager comprised of a single wagering unit may be apportioned equally or unequally among a plurality of pay lines. For example, when a single wagering unit is a dollar, twenty cents may be apportioned to wager on a first pay line, thirty-five cents may be apportioned to wager on a second pay line, and the remaining forty-five cents may be apportioned to wager on yet another pay line.

It will be appreciated by those skilled in the art that the embodiments herein described, while illustrating certain implementations of the present invention, are not intended to so limit the invention or the scope of the appended claims. Those skilled in the art will also understand that various combinations of, or modifications to, the disclosed embodiments may be made without departing from the scope of the invention.

What is claimed is:

1. A gaming machine comprising:

a display configured for a visually perceptible display of a plurality of slot machine reels, each reel having a plurality of indicia, and of a plurality of pay lines;

a wager input device;

a processor operably coupled to the display, the wager input device, and a memory, the processor being programmed to receive a wager from a player via the wager input device, the processor being programmed to receive a selection from the player of at least one of the plurality of pay lines, the processor being programmed to associate at least one of the plurality of pay lines with the at least one of the plurality of pay lines selected by the player, according to player gaming activity, the processor being programmed to display a plurality of indicia on each of the plurality of slot machine reels, the plurality of displayed indicia representing a slots game, the processor being programmed to determine at least one outcome associated with the slots game according to the at least one of the plurality of pay lines selected by the player and the at least one of the plurality of pay lines associated by the processor according to the player gaming activity, the processor being programmed to provide a payout to the player according to the at least one outcome.

2. The gaming machine according to claim 1, wherein the processor is programmed to associate the at least one of the plurality of pay lines with the at least one of the plurality of pay lines selected by the player at random, according to player gaming activity.

3. The gaming machine according to claim 1, wherein the player gaming activity comprises a rate of play.

4. The gaming machine according to claim 1, wherein the player gaming activity comprises a value amount associated with the wager.

5. The gaming machine according to claim 1, wherein the processor is programmed to access a central database to determine the player gaming activity.

6. The gaming machine according to claim 1, wherein:

the processor is programmed to receive a selection from the player of at least one of the plurality of pay lines in regard to a first slots game;

the processor is programmed to determine a first outcome associated with the first slots game according to the at least one of the plurality of pay lines selected by the player;

the processor is programmed to associate at least one of the plurality of pay lines with the at least one of the plurality of pay lines selected by the player, according to the first outcome in regard to a second slots game;

the processor is programmed to determine a second outcome associated with the second slots game; and the processor is programmed to provide a payout to the player according to the first and second outcomes.

7. The gaming machine according to claim 1, wherein:

the wager is a single wagering unit; and the at least one of the plurality of pay lines comprises more than two and less than all of the plurality of pay lines.

8. The gaming machine according to claim 1, wherein:

at least one of the at least one of the plurality of pay lines selected by the player and the at least one of the plurality of pay lines associated by the processor according to player gaming activity comprises at least one slot machine indicia from at least two of the slot machine reels and from fewer than all of the slot machine reels.

9. The gaming machine according to claim 1, wherein the display comprises at least one of an electronic video display, electronically-controlled reels, or electromechanically-controlled reels.

10. The gaming machine according to claim 1, wherein the wager input device comprises at least one of a coin acceptor, a bill acceptor or a card reader.

11. The gaming machine according to claim 1, comprising a pay line input device operably coupled to the processor, the pay line input device being used by the player to provide the selection of the at least one of the plurality of pay lines, the pay line input device comprising at least one of a button, a plurality of buttons, a touch sensitive screen, a touch pad, a mouse, or a light pen.

12. A method of playing a game, the game practiced using a plurality of slot machine reels, each reel having a plurality of indicia, and of a plurality of pay lines, the method comprising:

receiving a wager from a player;

receiving a selection from the player of at least one of the plurality of pay lines;

automatically associating at least one of the plurality of pay lines with the at least one of the plurality of pay lines selected by the player, according to player gaming activity;

displaying a plurality of indicia on each of the plurality of slot machine reels, the plurality of displayed indicia representing a slots game;

determining at least one outcome associated with the slots game according to the at least one of the plurality of pay lines selected by the player and the at least one of the plurality of pay lines associated by the processor according to the player gaming activity; and providing a payout to the player according to the at least one outcome.

13. The method according to claim 12, comprising:

automatically associating the at least one of the plurality of pay lines with the at least one of the plurality of pay lines selected by the player at random according to player gaming activity.

14. The method according to claim 12, wherein the player gaming activity comprises a rate of play.

15. The method according to claim 12, wherein the player gaming activity comprises a value amount associated with the wager.

16. The method according to claim 12, comprising:

accessing a central database to determine the player gaming activity.

17. The method according to claim 12, comprising:

receiving a selection from the player of at least one of the plurality of pay lines in regard to a first slots game;

determining a first outcome associated with the first slots game according to the at least one of the plurality of pay lines selected by the player;

automatically associating at least one of the plurality of pay lines with the at least one of the plurality of pay lines selected by the player, according to the first outcome in regard to a second slots game;

determining a second outcome associated with the second slots game; and providing a payout to the player according to the first and second outcomes.

18. The method according to claim 12, wherein:

the wager is a single wagering unit; and the at least one of the plurality of pay lines selected by the player comprises a first plurality of pay lines including more than two and less than all of the plurality of pay lines.

19. The method according to claim 18, comprising:

receiving a further wager of a single wagering unit from the player; and receiving a selection of a second plurality of pay lines from the player, the second plurality of pay lines including more than two and less than all of the plurality of pay lines, the first and second pluralities of pay lines being non-overlapping.

20. The method according to claim 12, wherein:

at least one of the at least one of the plurality of pay lines selected by the player and the at least one of the plurality of pay lines automatically associated by the processor according to player gaming activity comprises at least one slot machine indicia from at least two of the slot machine reels and from fewer than all of the slot machine reels.

* * * * *

UNITED STATES PATENT AND TRADEMARK OFFICE

CERTIFICATE OF CORRECTION

PATENT NO. : 7,156,736 B2
APPLICATION NO. : 11/086524
DATED : January 2, 2007
INVENTOR(S) : William R. Adams et al.

It is certified that error appears in the above-identified patent and that said Letters Patent is hereby corrected as shown below:

Column 14, line 4, "random" should be -- random, --.

Signed and Sealed this

Twenty-fourth Day of July, 2007

JON W. DUDAS
*Director of the United States Patent and Trademark Office*